(12) United States Patent
Wu et al.

(10) Patent No.: US 9,391,513 B2
(45) Date of Patent: Jul. 12, 2016

(54) METHOD OF CURRENT COMPENSATION BASED ON DIVISION-SIGMA CONTROL FOR DC/DC CONVERTER

(71) Applicant: National Tsing Hua University, Hsinchu (TW)

(72) Inventors: Tsai-Fu Wu, Chiayi County (TW); Tin-Hao Chang, Kaohsiung (TW); Li-Chun Lin, Taoyuan (TW); Chih-Hao Chang, Tainan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 7 days.

(21) Appl. No.: 14/672,719

(22) Filed: Mar. 30, 2015

(65) Prior Publication Data
US 2016/0164407 A1 Jun. 9, 2016

(30) Foreign Application Priority Data

Dec. 8, 2014 (TW) .............................. 103142696 A (51) Int. Cl.
*H02M 3/156* (2006.01)
*H02M 3/335* (2006.01)

(52) U.S. Cl.
CPC .......... *H02M 3/156* (2013.01); *H02M 3/33507* (2013.01); *H02M 3/33546* (2013.01)

(58) Field of Classification Search
CPC ..... H02M 1/32; H02M 3/28; H02M 3/33507; H02M 3/157; H02M 3/1582; H02M 3/155; H02M 3/158; H02M 3/156; H02M 3/325; H02M 3/33569; H02M 3/33546; H02M 7/335; H02M 7/5387; H02M 7/53871; G05F 1/56; G05F 1/569

USPC ................. 323/282, 283, 271, 273, 276, 351; 363/16, 17, 55, 56.02, 95, 97
See application file for complete search history.

(56) References Cited

U.S. PATENT DOCUMENTS

| | | | | |
|---|---|---|---|---|
| 5,994,885 | A * | 11/1999 | Wilcox ................. | H02M 3/156 323/283 |
| 2005/0276085 | A1* | 12/2005 | Winn ............... | H02M 7/53871 363/132 |
| 2006/0119493 | A1* | 6/2006 | Tal ...................... | H03M 7/3017 341/143 |
| 2007/0067069 | A1* | 3/2007 | Markowski ......... | H02M 1/4225 700/297 |
| 2010/0320983 | A1* | 12/2010 | Wu ..................... | H02M 3/1584 323/283 |
| 2011/0068966 | A1* | 3/2011 | Daniels ................. | G04F 10/005 341/161 |
| 2012/0146823 | A1* | 6/2012 | Silva ..................... | G01R 19/02 341/143 |
| 2013/0187561 | A1* | 7/2013 | Franck ............... | H05B 33/0815 315/201 |
| 2016/0013663 | A1* | 1/2016 | Zhang .................... | H02J 5/005 307/104 |

* cited by examiner

*Primary Examiner* — Adolf Berhane
(74) *Attorney, Agent, or Firm* — Jackson IPG PLLC; Demian K. Jackson (57) ABSTRACT

A method is provided for current compensation. The method is based on division-sigma (D-Σ) control for a DC/DC converter. Inductance changes are allowed with D-Σ digital control achieved. Loop gain can be quickly adjusted. The disadvantage of average current-mode control (ACMC) is solved, where the disadvantage is a reduction of the response speed caused by the filter within the current loop. The present invention uses midpoint current sampling to ensure taking an average inductor current value in each switching cycle. By doing so, a lack of fidelity of peak current-mode control (PCMC) is solved, where the lack of fidelity is due to the amount of error value between the peak value and the average value. Besides, the present invention uses a table of the inductance following current changes to achieve compensation of duty cycle ratio, where the table is built in a single chip.

8 Claims, 10 Drawing Sheets

METHOD OF CURRENT COMPENSATION BASED ON DIVISION-SIGMA CONTROL FOR DC/DC CONVERTER

FIELD OF THE INVENTION

The present invention relates to current compensation for a DC/DC converter; more particularly, relates to a control method through an electronic circuit to allow current compensation with big inductance variation.

BACKGROUND OF THE INVENTION

Energy is the material basis for human society to survive, and is also an important resource for social and economic development. Since the industrial revolution, kerosene, gas oil and fossil fuels gradually become the main energies for production and life. However, excessive consumption of fossil fuels in today's society highlights the growing problem of energy crisis and environmental protection. Hence, the developments of green energies as ideal alternative energies are in full swing. The green energy, such as solar power, requires a maximum power point tracker and an electrical charging/discharging circuit to form a DC power supply. Yet, the traditional mechanism for regulating the output voltage of the DC power supply only processes a single signal of output voltage yet ignores the control and protection of inductor current, which may easily result in burning the power component owing to over-flowing current.

Therefore, methods were developed for current control. For example, Brad Bryant proposed peak current mode control (PCMC) in 2005 (Brad Bryant and Marian K. Kazimierczuk, "Modeling the Closed-Current Loop of PWM Boost DC-DC Converters Operating in CCM With Peak Current-Mode Control, "IEEE Trans. on Circuits and Systems, Vol. 52, No. 11, November 2005.); and, Yingyi Yan et al. proposed average current-mode control (ACMC) in 2014 (Yingyi Yan, Fred C. Lee, Paolo Mattavelli and Pei-Hsin Liu, "I2 Average Current Mode Control for Switching Converters, "IEEE Trans. on Power Electronics, Vol. 29, No. 4, April 2014.). They control and protect the switching element through current inner-circuit, but these control methods still have some drawbacks.

In a paper, Lloyd Dixon described shortcomings of PCMC that a distortion might happen owing to the error value between the peak value and the average value and that its ability on preventing noise interference was not good (Lloyd H. Dixon, "Average Current Mode Control of Switching power Supplies," Unitrode Application, Vol. 3, pp. 356-359, 1999.). The control method of PCMC is to switch the state to off after the peak inductor current reaches the command of reference current, which is not done by comparing the current average to the command of reference current. Therefore, when the inductor current ripple is big, duty ratio may be decreased due to the error value between the peak value and the average value and the regulation mechanism of output voltage may be further affected.

In another paper, Tsai-Fu Wu et al. described a shortcoming of ACMC about the slow response to output voltage (Tsai-Fu Wu, Chih-Hao Chang, Li-Chiun Lin, and Yung-Ruei Chang, "Current Improvement for a 3φ Bi-directional Inverter with Wide Inductance Variation," 8th International Conference on Power Electronics—ECCE Asia, May 30-Jun. 3, 2011.). ACMC has an extra set of filters in the current inner-circuit to filter out instant inductance current for solving the problem of the distortion made by PCMC owing to the error value between the peak value and the average value and filtering out the current ripple happened on switching the power element. Consequently, as compared to PCMC, ACMC has a better ability of preventing noise interference. However, an extra set of filter is required with the difficulty of design increases and relatively reduces the speed of responding the output voltage.

Hence, the prior arts do not fulfill all users' requests on actual use.

SUMMARY OF THE INVENTION

The main purpose of the present invention is to provide a division-sigma (D-Σ) control method through an electronic circuit to allow current compensation for big inductance variation.

Another purpose of the present invention is to solve the problem of slow response of ACMC owing to the added filters in the current inner-circuit.

Another purpose of the present invention is to ensure taking an average inductor current value in each switching cycle by sampling the current at center of carrier wave for solving the problem of the distortion made by PCMC owing to the error value between the peak value and the average value.

Another purpose of the present invention is to achieve compensation of duty ratio by building a table in a single chip with the inductance following the current changes.

Another purpose of the present invention is to accurately track the command of reference current by the converter with big inductance variation allowed and to significantly further reduce the volume of the core even when the inductance decays as the inductor current increases.

To achieve the above purposes, the present invention is a method of current compensation based on D-Σ control for a DC/DC converter, comprising steps of: (a) multiplying a difference between a reference voltage and a voltage output feedback by a voltage-error compensation to obtain a reference current; (b) figuring out an inductor current variation through the reference current and figuring out a duty ratio with the inductor current variation through a characteristic formula of D-Σ digital control; (c) figuring out an inductor current through a transference function with the duty ratio in an operation of a system to regulate output voltage with the inductor current and an effective impedance outputted from the system; and (d) outputting a voltage. Accordingly, a novel method of current compensation based on D-Σ control for a DC/DC converter is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
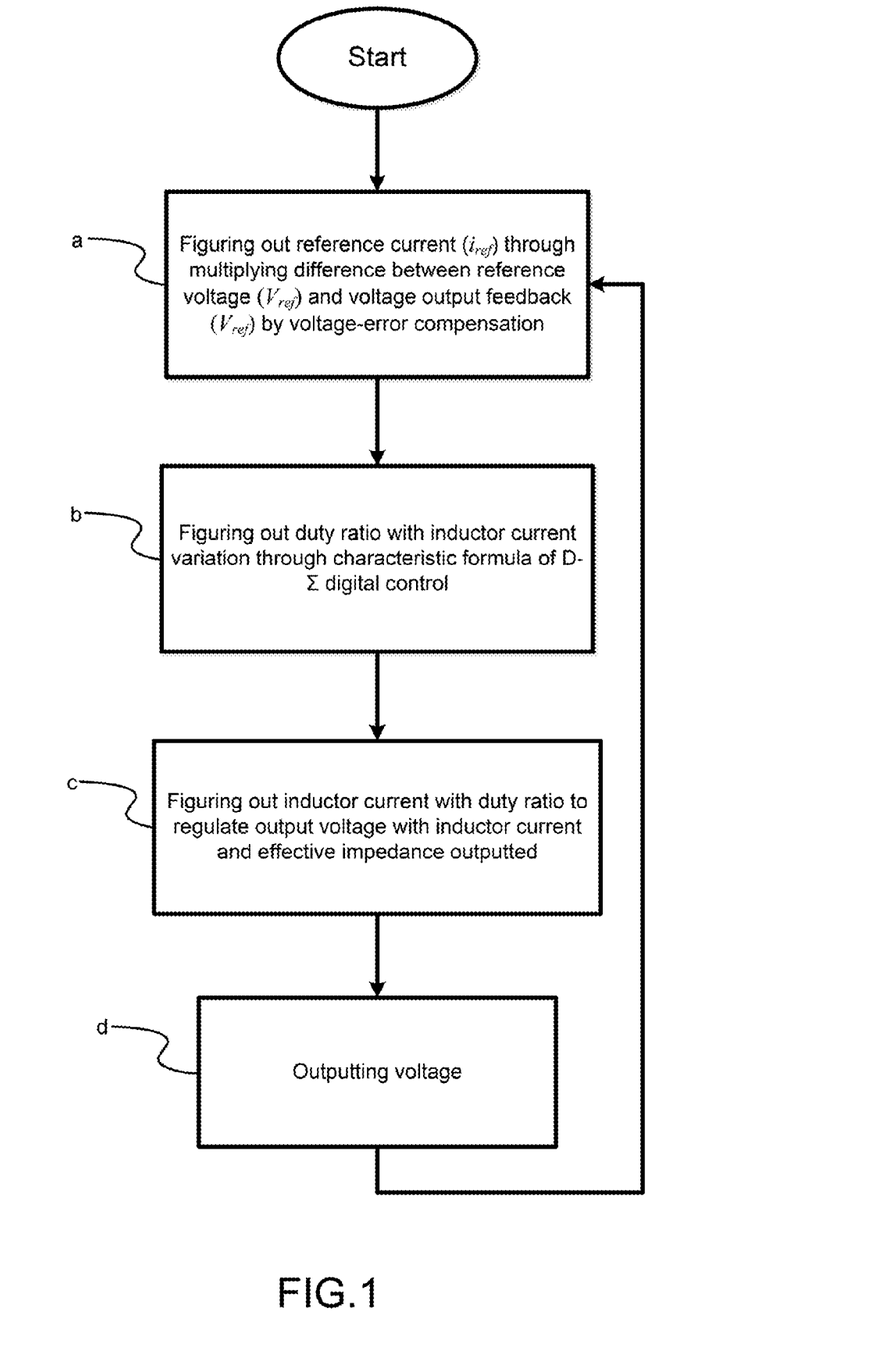
FIG. 1 is the flow view showing the preferred embodiment according to the present invention.
Figure 2:
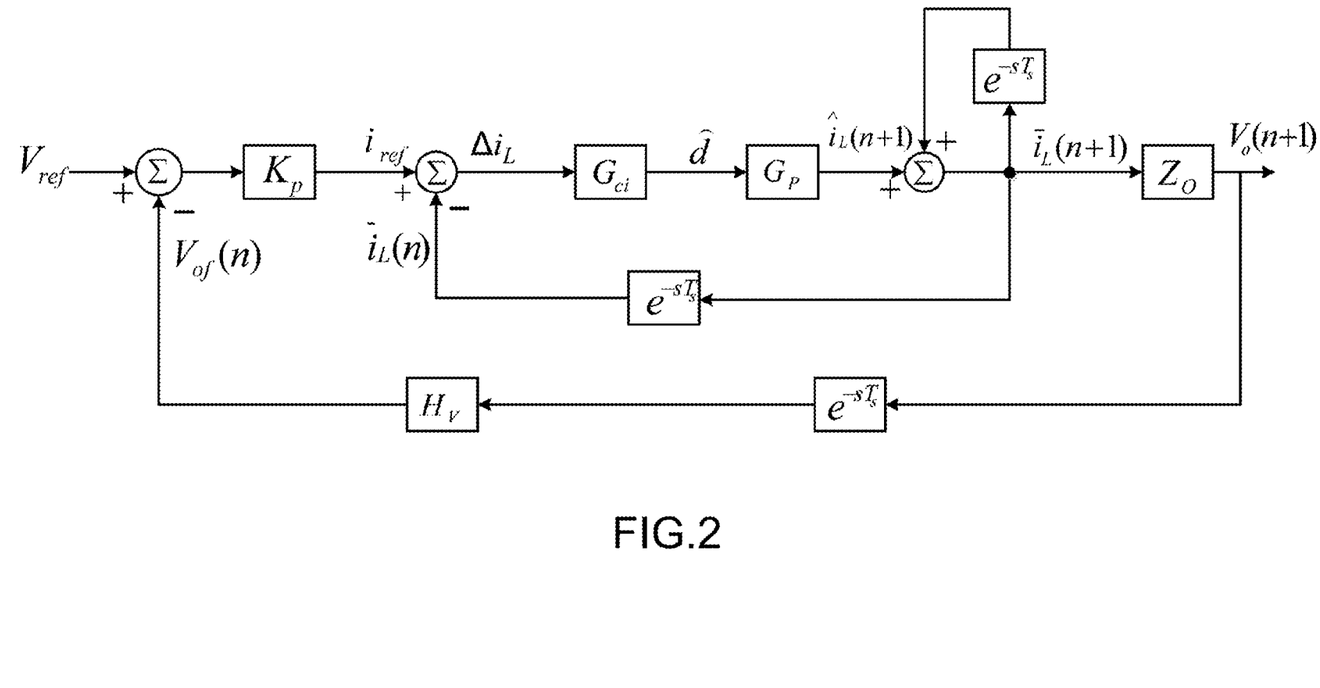
FIG. 2 is the block view showing the preferred embodiment.

Please refer to FIG. 1 to FIG. 10, which are a flow view and a block view showing a preferred embodiment according to the present invention; views showing circuits of a buck converter, a boost converter, a buck-boost converter, a flyback converter, a forward converter and a full-bridge converter, separately; a block view showing an equivalent circuit and control of a unidirectional buck converter; and a view showing a process of midpoint current sampling. As shown in the figures, the present invention is a method of current compensation based on division-sigma (D-Σ) control for a DC/DC converter. By denoting a command of an output voltage $V_O$ as $V_{ref}$, a tracking command of an inductor current $i_L$ is denoted as $i_{ref}$ and is figured out with the output voltage $V_O$ and the voltage command $V_{ref}$; and, through D-Σ control, the converter can precisely track the $i_{ref}$. The present invention comprises the following steps:

(a) A difference between a reference voltage ($V_{ref}$) and a voltage output feedback ($V_{of}$) is multiplied by a voltage-error compensation ($K_p$) to figure out a reference current ($i_{ref}$). Therein, after being delayed for one cycle through a delay circuit, the voltage output feedback ($V_{of}$) is passed through a filter whose gain is 1.

(b) The inductor current ($i_L(n)$) for the voltage output feedback ($V_{of}$), which is delayed for one cycle through the delay circuit, is subtracted by the reference current ($i_{ref}$) to obtain an inductor current variation ($\Delta i_L$) and a duty ratio (d) is figured out with the inductor current variation ($\Delta i_L$) through a characteristic formula of D-Σ digital control. Therein, in the characteristic formula of D-Σ digital control, an on/off state of voltage (u) is multiplied by a switching period ($T_S$) to obtain a D-Σ transformation matrix, where the D-Σ transformation matrix is expressed as follows:

$$uT_s = [u_{on} \ u_{off}] \begin{bmatrix} T_{on} \\ T_{off} \end{bmatrix}.$$

(c) An inductor current ($i_L(n+1)$) is obtained through a transference function ($G_p$) with the duty ratio (d) in an operation of a system to regulate output with the inductor current ($i_L(n+1)$) and an effective impedance ($Z_O$) outputted from the system.

(d) At last, a voltage ($V_O(n+1)$) is outputted.

Thus, a novel method of current compensation based on D-Σ control for a DC/DC converter is obtained.

Figure 3:
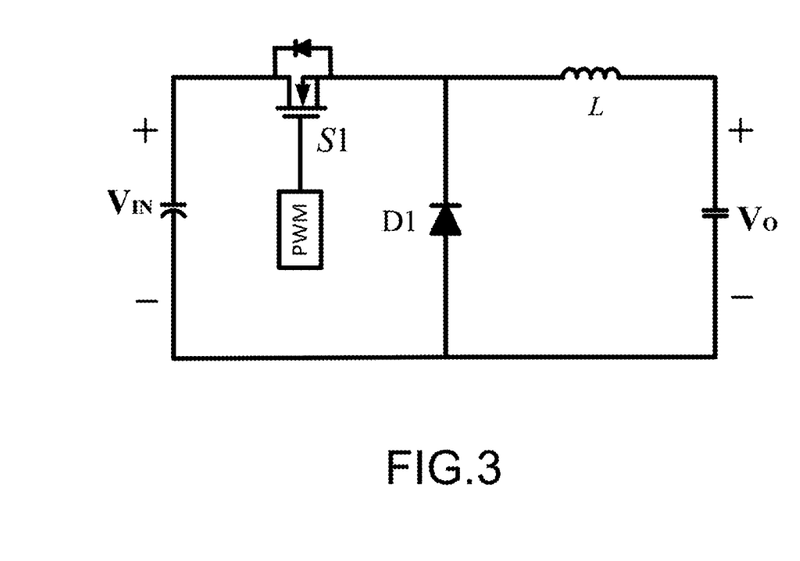
FIG. 3 is the view showing the circuit of the buck converter.

The DC/DC converter can be a buck converter, whose circuit is shown in FIG. 3. According to Kirchhoff's voltage law, a circuit formula is shown in Formula 1, where dt is the time during switch on, $V_O$ is an output voltage, L is an inductance, $di_L$ is an inductor current variation:

$$u = L\frac{di_L}{dt} + V_0.$$ Formula 1

Through transposition of Formula 1, Formula 2 is obtained, where the inductance L is used as a variable and is different from the traditional practice of being used as a constant:

$$uT_S = Ldi_L + V_O T_S$$ Formula 2.

After Formula 2 is processed through a D-Σ transformation matrix, Formula 3 is obtained, where the D-Σ transformation matrix of $u_{on}$ and $u_{off}$ is obtained through an overlapping principle with the cycle $T_S$:

$$[u_{on} \ u_{off}] \begin{bmatrix} T_{on} \\ T_{off} \end{bmatrix} = Ldi_L + V_O T_S.$$ Formula 3

Figure 4:
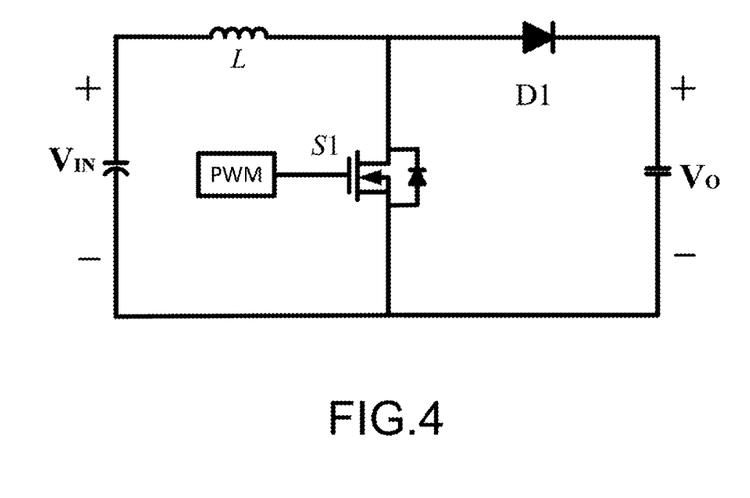
FIG. 4 is the view showing the circuit of the boost converter.

Since $u_{off}$ is 0, the matrix can be further simplified. Because the conducting time ($T_{on}$) is the product of the duty ratio (d) and the time of the cycle ($T_s$), the duty ratio (d) can be obtained after transposition as shown in FIG. 4, where $V_{IN}$ is an input voltage:

$$d = \frac{L\Delta i_L}{V_{IN}T_S} + \frac{V_O}{V_{IN}}.$$ Formula 5

Figure 5:
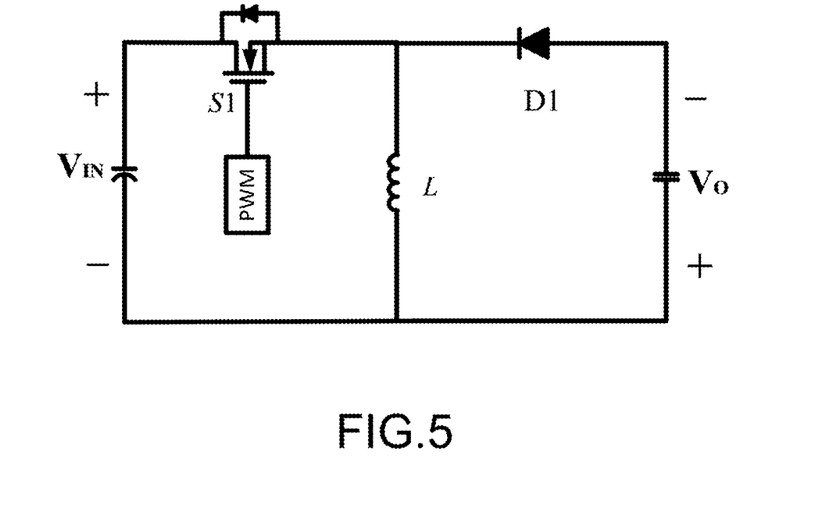
FIG. 5 is the view showing the circuit of the buck-boost converter.

Furthermore, the DC/DC converter can be a buck-boost converter, whose circuit is shown in FIG. 5. In the same manner described above, the duty ratio (d) can be figured out as follows:

$$d = \frac{L\Delta i_L}{V_{IN}T_S} + \frac{V_O}{V_{IN}}.$$ Formula 6

Figure 6:
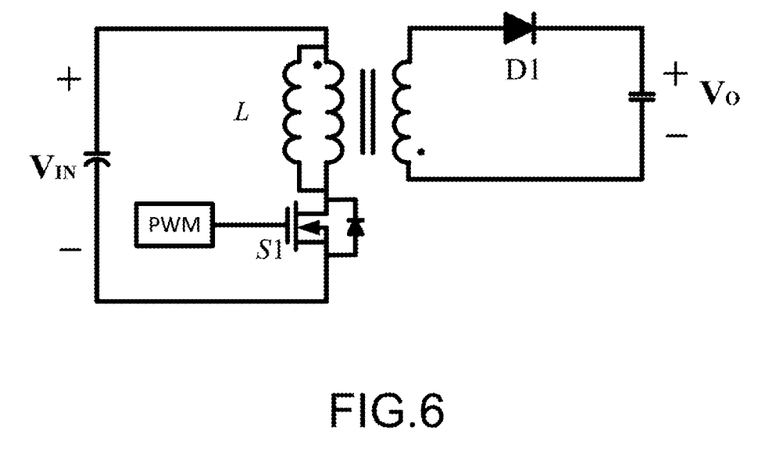
FIG. 6 is the view showing the circuit of the flyback converter.

Furthermore, the DC/DC converter can be a flyback converter, whose circuit is shown in FIG. 6. In the same manner described above, the duty ratio (d) can be figured out as follows:

$$d = \frac{Ldi_L}{(V_{IN} + NV_O)T_S} + \frac{NV_O}{V_{IN} + NV_O}.$$ Formula 7

Figure 7:
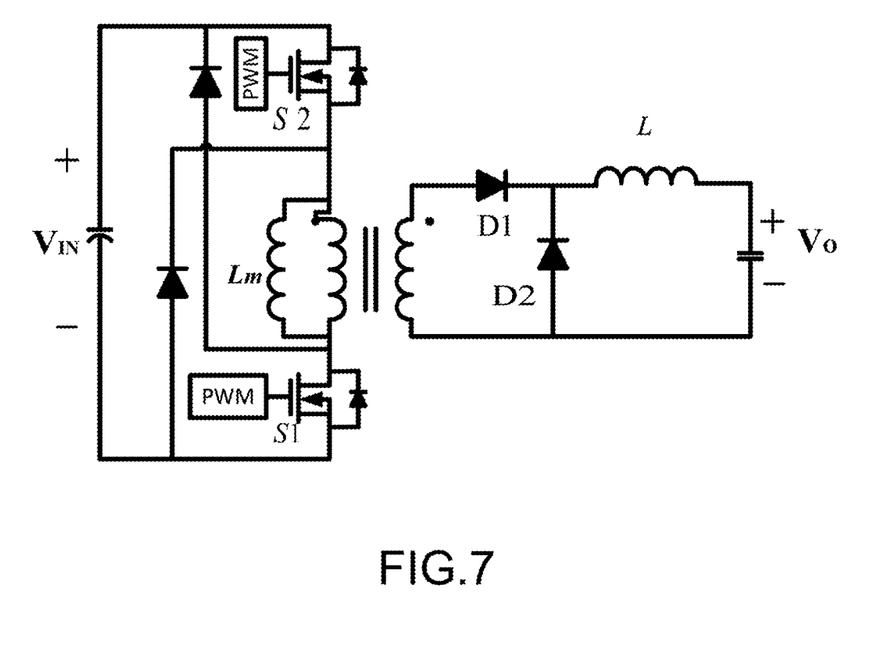
FIG. 7 is the view showing the circuit of the forward converter.

Furthermore, the DC/DC converter can be a forward converter, whose circuit is shown in FIG. 7. In the same manner described above, the duty ratio (d) can be figured out as follows:

$$d = \frac{L\Delta i_L}{V_{IN}T_S} + \frac{V_O}{V_{IN}}.$$ Formula 8

Figure 8:
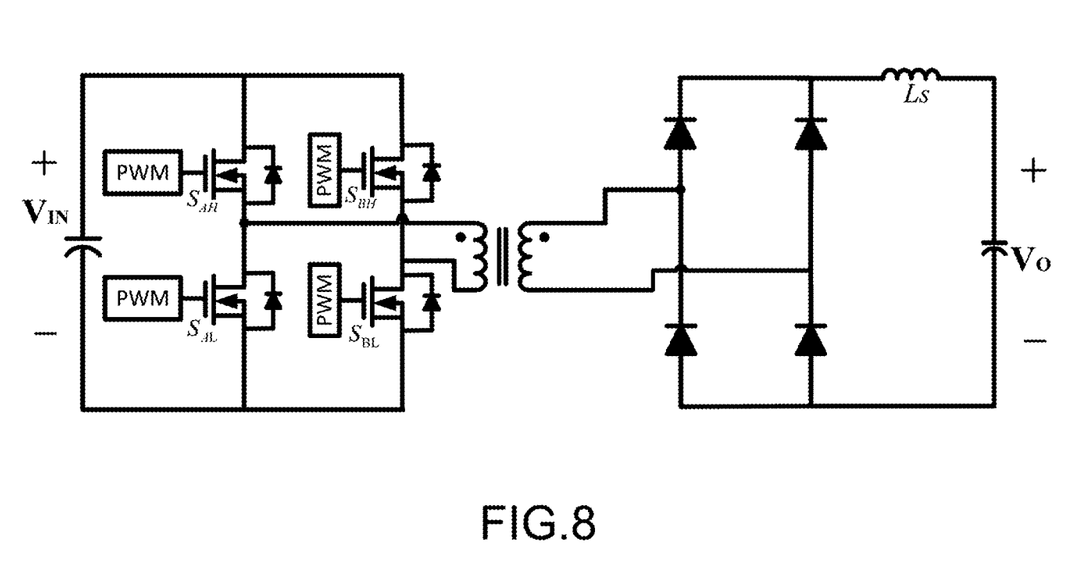
FIG. 8 is the view showing the circuit of the full-bridge converter.

Furthermore, the DC/DC converter can be a full-bridge converter, whose circuit is shown in FIG. 8. In the same manner described above, the duty ratio (d) can be figured out as follows:

$$d = \frac{L\Delta i_L}{V_{IN}T_S} + \frac{V_O}{V_{IN}}.\qquad\text{Formula 9}$$

Figure 9:
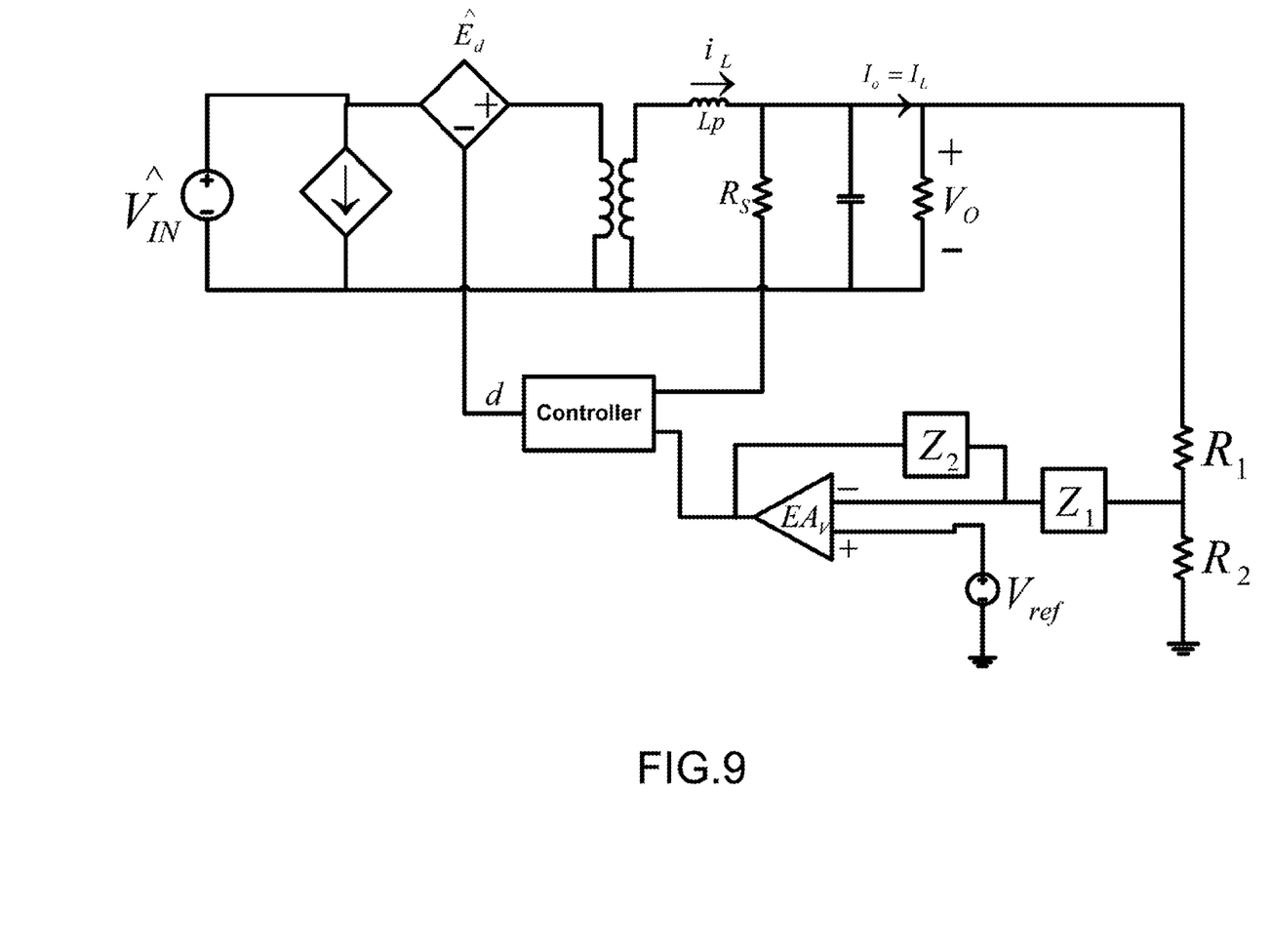
FIG. 9 is the block view showing the equivalent circuit and control of the unidirectional buck converter.

The buck converter shown in FIG. 3 is taken as an example. When the switch cuts in, the equivalent circuit is shown in FIG. 9. The control block diagram of the S domain is shown in FIG. 2, which is also the flow view of FIG. 1. Therein, $$G_P = \frac{V_{IN}T_S}{L}$$

and $G_{ci}$ is the reciprocal (inverse). This design is to eliminate variations of the inductor (L) and the switching cycles ($T_S$) for increasing robustness of the tracking of current.

Figure 10:
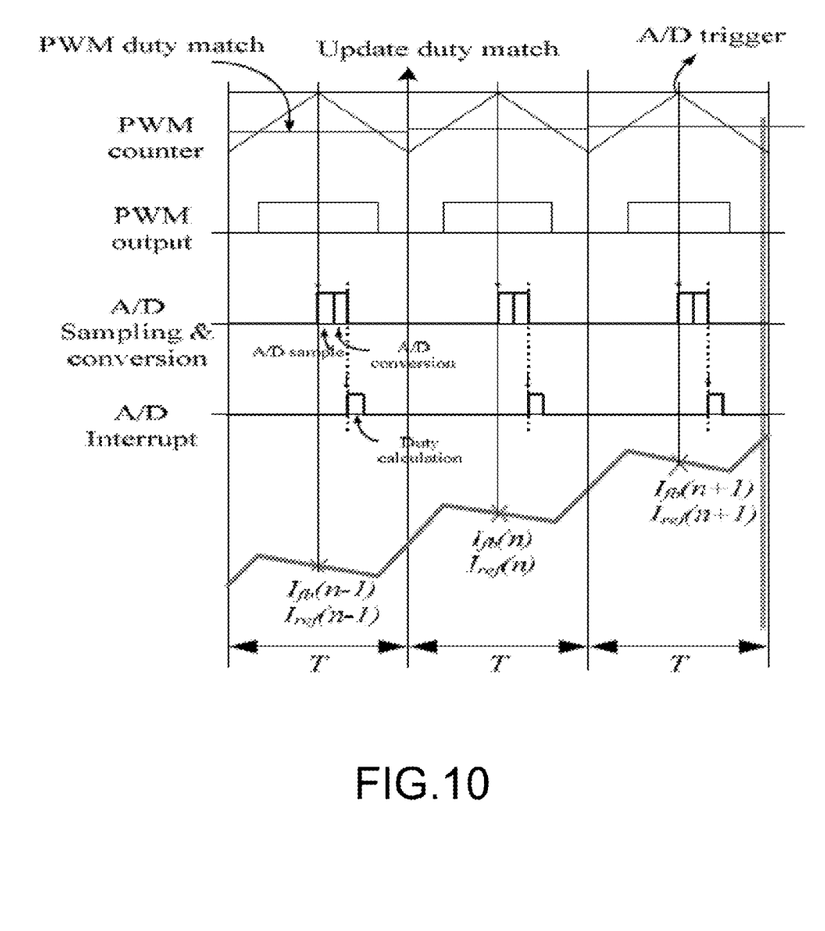
FIG. 10 is the view showing the process of sampling the current at center.

Accurately sampling the current is the key for ensuring the tracking of the reference current $i_{ref}$ by the average value of current feedback $i_{fb}$ in each switching cycle. In FIG. 10, the process of midpoint current sampling is operated in a mechanism of a switching cycle. As shown in FIG. 10, a pulse width modulation (PWM) counter has a carrier signal. When the counter reaches a carrier peak (ie the center, because the carrier is a triangle wave), the processes of sampling and converting of analog-to-digital (A/D) are triggered to ensure taking an average inductor current value in each switching cycle. Thus, it is possible to solve the problem of the distortion made by peak current-mode control (PCMC) owing to the error value between the peak value and the average value. Switching noise being sampled when the switch is switching can be avoided. Besides, because the D-Σ digital control does not have extra filters in the current inner-circuit, the current variation in a cycle can be compensated immediately. Thus, the problem of slow response of average current-Mode control (ACMC) is solved.

The present invention provides D-Σ digital control under inductor changes for quickly adjusting loop gain and solving the problem of slow response of ACMC. Besides, the present invention uses the method of sampling the current at carrier center for ensuring taking an average inductor current in each switching cycle. Thus, the problem of distortion made by PCMC owing to the error value between the peak value and the average value is solved. In the mean time, compensation of duty ratio is achieved by building a table in a single chip with the inductance following the current changes. Hence, the present invention solves the problems of ACMC and PCMC and allows big inductance variation, where the converter can still accurately track the command of reference current and further significantly reduce the volume of the core even when the inductance decays as the inductor current increases.

To sum up, the present invention is a method of current compensation based on D-Σ control for a DC/DC converter, where a D-Σ digital control uses a process of midpoint current sampling to accurately track the command of reference current by the average of inductor current while extra filters in the current inner-circuit are not necessary and current can be compensated immediately for solving the problems of ACMC and PCMC.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of current compensation based on division-sigma (D-Σ) control for a DC/DC converter, comprising steps of:

(a) multiplying a difference between a reference voltage ($V_{ref}$) and a voltage output feedback ($V_{of}$) by a voltage-error compensation ($K_p$) to obtain a reference current ($i_{ref}$);

(b) obtaining an inductor current variation ($\Delta i_L$) through said reference current ($i_{ref}$) and obtaining a duty ratio (d) with said inductor current variation ($\Delta i_L$) through a characteristic formula of D-Σ digital control;

(c) obtaining an inductor current ($i_L(n+1)$) through a transference function ($G_p$) with said duty ratio (d) in an operation of a system to regulate output with said inductor current ($i_L(n+1)$) and an effective impedance ($Z_O$) outputted from said system; and (d) outputting a voltage ($V_O(n+1)$).

2. The method according to claim 1, wherein, in said characteristic formula of D-Σ digital control, an on/off state of voltage ($u_{on}/u_{off}$) is multiplied by a switching time ($T_S$) to obtain a D-Σ transformation matrix; and wherein said D-Σ transformation matrix is expressed as follows:

$$uT_S = [\,u_{on}\ \ u_{off}\,]\begin{bmatrix}T_{on}\\T_{off}\end{bmatrix}.$$

3. The method according to claim 1, wherein the DC/DC converter is a buck converter to obtain said responsibility ratio (d) through the following formula:

$$d = \frac{L\Delta i_L}{V_{IN}T_S} + \frac{V_O}{V_{IN}};$$

and wherein L is an inductance, $\Delta i_L$ is an inductor current variation, $V_{IN}$ is an input voltage, $V_O$ is an output voltage and $T_S$ is a switching time.

4. The method according to claim 1, wherein the DC/DC converter is a boost converter to obtain said responsibility ratio (d) through the following formula:

$$d = \frac{L\Delta i_L}{V_O T_S} + \frac{V_O - V_{IN}}{V_O};$$

and wherein L is an inductance, $\Delta i_L$ is an inductor current variation, $V_{IN}$ is an input voltage, $V_O$ is an output voltage and $T_S$ is a switching time.

5. The method according to claim 1, wherein the DC/DC converter is a buck-boost converter to obtain said responsibility ratio (d) through the following formula:

$$d = \frac{L\Delta i_L}{(V_{IN}+V_O)T_S} + \frac{V_O}{V_{IN}+V_O};$$

and wherein L is an inductance, $\Delta i_L$ is an inductor current variation, $V_{IN}$ is an input voltage, $V_O$ is an output voltage and $T_S$ is a switching time.

6. The method according to claim 1,
wherein the DC/DC converter is a flyback converter to obtain said responsibility ratio (d) through the following formula:

$$d = \frac{Ldi_L}{(V_{IN}+NV_O)T_S} + \frac{NV_O}{V_{IN}+NV_O};$$

and wherein L is an inductance, $di_L$ is an inductor current, $V_{IN}$ is an input voltage, $V_O$ is an output voltage, $T_S$ is a switching time and N is a number of coil turns.

7. The method according to claim 1,
wherein the DC/DC converter is a forward converter to obtain said responsibility ratio (d) through the following formula:

$$d = \left(\frac{L\Delta i_L}{V_{IN}T_S} + \frac{V_O}{V_{IN}}\right)N;$$

and wherein L is an inductance, $\Delta i_L$ is an inductor current variation, $V_{IN}$ is an input voltage, $V_O$ is an output voltage, $T_S$ is a switching time and N is a number of coil turns.

8. The method according to claim 1,
wherein the DC/DC converter is a full-bridge converter to obtain said responsibility ratio (d) through the following formula:

$$d = \left(\frac{2L\Delta i_L}{V_{IN}T_S} + \frac{V_O}{V_{IN}}\right)N;$$

and wherein L is an inductance, $\Delta i_L$ is an inductor current variation, $V_{IN}$ is an input voltage, $V_O$ is an output voltage, $T_S$ is a switching time and N is a number of coil turns.

* * * * *